May 20, 1969   G. F. OLSEN ET AL   3,445,099
ROTARY KILN LININGS

Filed Jan. 22, 1968                Sheet 1 of 5

INVENTORS
GEORGE FRANKLIN OLSEN
DONALD L. McLEOD
BY
AGT.

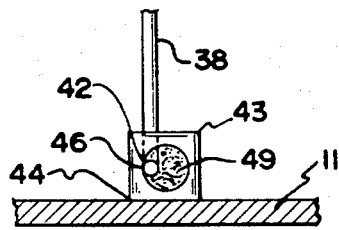
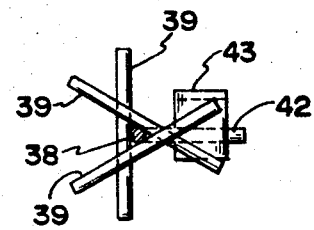
Fig-3A
Fig-3B
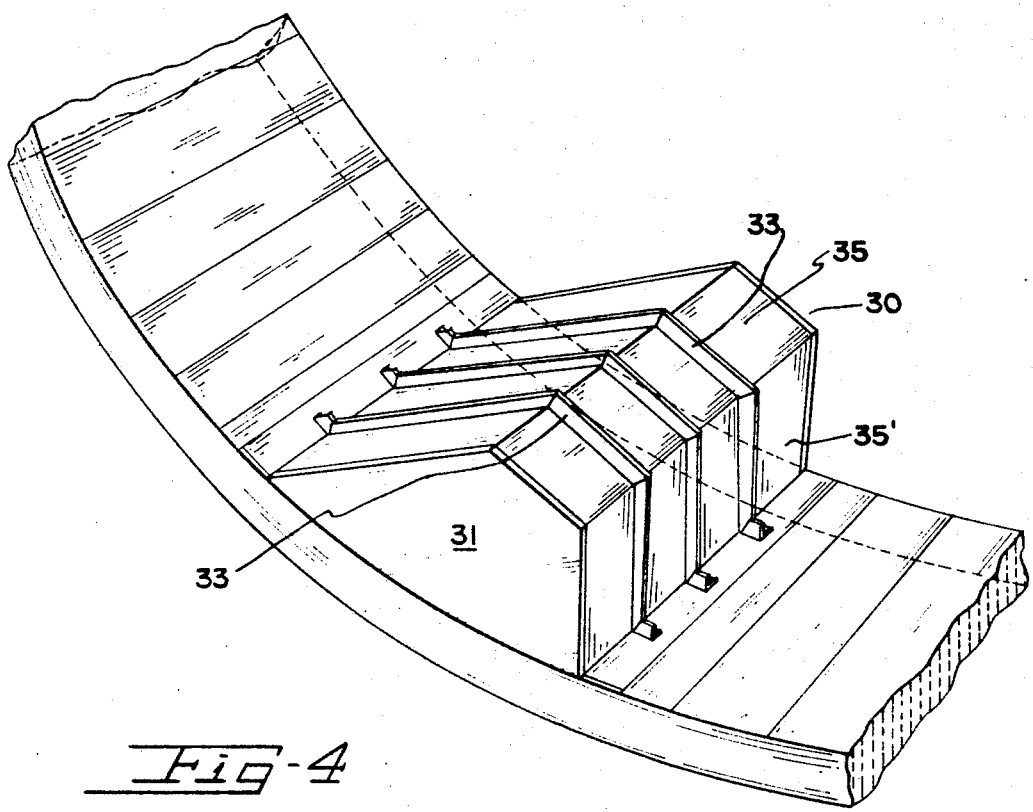
Fig-4

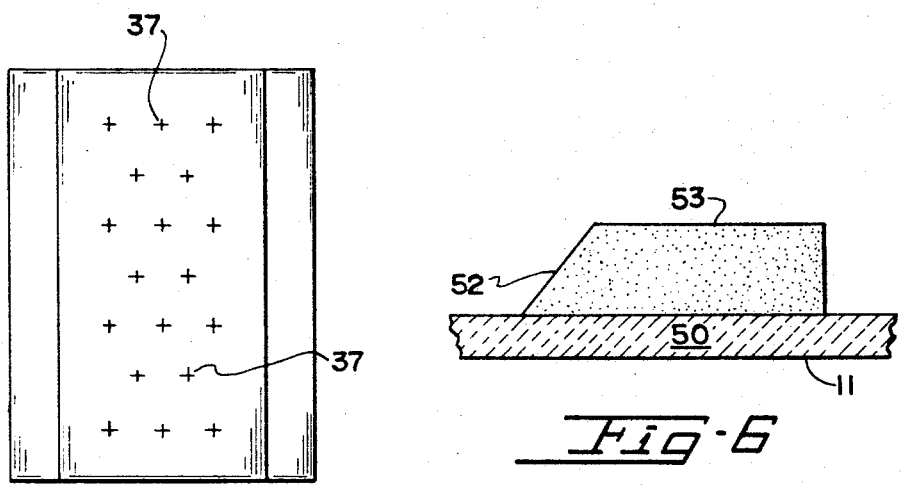
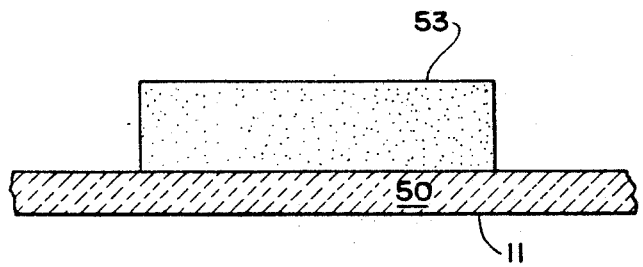
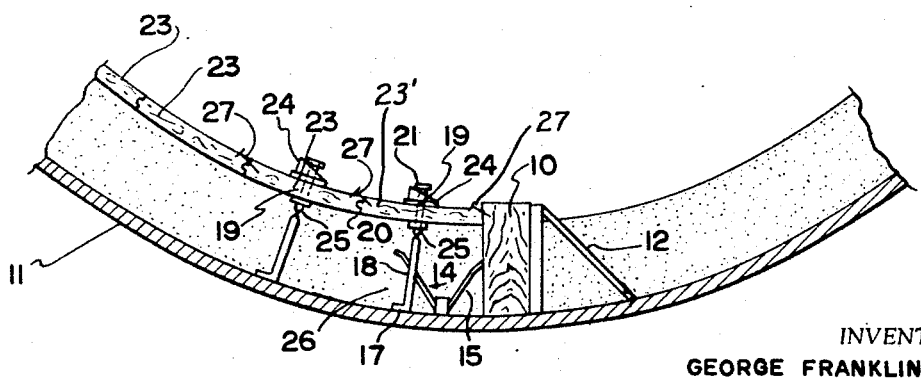

INVENTORS
GEORGE FRANKLIN OLSEN
BY DONALD L. McLEOD

AGT.

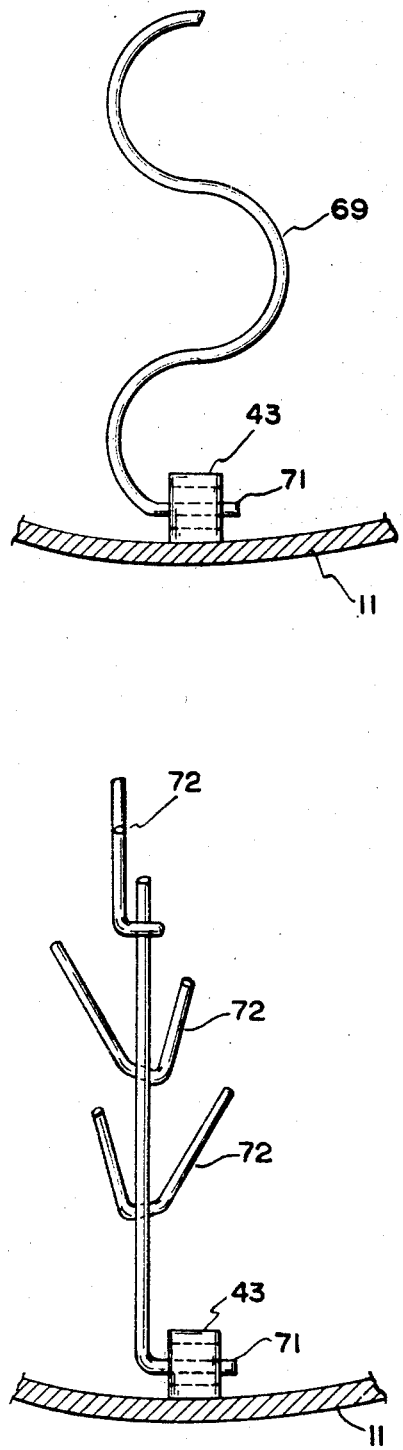
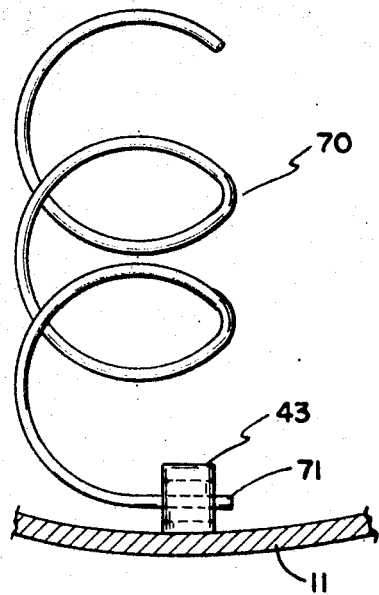
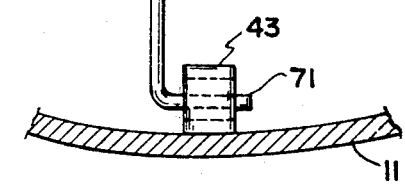

United States Patent Office 3,445,099
Patented May 20, 1969

3,445,099
ROTARY KILN LININGS
George Franklin Olsen, Colton, and Donald L. McLeod, Oakland, Calif., assignors to Kaiser Aluminum & Chemical Corporation, Oakland, Calif., a corporation of Delaware
Filed Jan. 22, 1968, Ser. No. 699,556
Int. Cl. F27b 1/14; F27d 1/00
U.S. Cl. 263—33                              11 Claims

ABSTRACT OF THE DISCLOSURE

An improved rotary kiln lining comprising at least one monolithic refractory projecting or lifter element disposed generally longitudinally about the periphery of the interior or exposed face of the rotary kiln refractory lining, the projecting element being suitably contoured to lift or carry a portion of a load passing through the kiln upwardly along the periphery of the lining and to discharge it back to the load bed as rotation of the kiln progresses, the projecting element including an anchor or elongated tie means, suitably a plurality thereof, floatably or flexibly affixed to the kiln shell, whereby as stresses develop during operation of the kiln, the anchor device or tie means for such element becomes detached from its original rigid connection while being adapted to restrained or restricted motion to adjust to relative motion of the shell with respect to the refractory lining during operation.

Background of the invention

The invention relates to improved refractory linings for rotary kilns, such as are used in the production of portland cement, for instance; and more particularly, it relates to the provision in such linings of projecting elements, especially lifter elements, which are of substantial size and monolithic in structure, and to anchoring means for retaining and reinforcing such elements in place in the lining.

In the operation of rotary kilns, and this will be discussed principally with reference to the production of portland cement clinker although it will be understood that it applies equally to the production of burnt lime, alumina, calcined products such as coke, clay, sodium silicate and other burned or calcined products, a feed charge or load is introduced at one end of the kiln which is disposed in the known way with its longitudinal axis at a slight slope to the horizontal or the base upon which it rests, and the load travels downwardly toward the discharge end, being disposed in the lower segment of the approximately circular cross-section of a kiln, as the kiln rotates. The burners are introduced adjacent the discharge end so that the temperatures in the kiln become progressively hotter as the discharge end is approached. In view of the nature of the traveling bed, various problems arise in the operation of rotary kilns and among these are the production of a high dust load due to pick up of the finer particles by the hot gases traveling upwardly through the kiln toward the feed end and lack of uniform heating of the bed because of insufficient agitation and because the uppermost portions will tend to remain in the uppermost section of the bed, whereby some portions of the charge become overburned or overheated and other portions are underburned.

Various means and methods have been proposed in the past to solve these problems and overcome these disadvantages and among these have been the so-called trefoil kiln, or alternatively, the installation of lifters, both of these devices being incorporated toward the hotter ends of the kiln although not usually directly in the burning or highest temperature zone of the kiln. In the trefoil kiln, the entire interior of the kiln is divided longitudinally into three or more segments by refractory block walls or by metal walls which are coated and protected with refractories. Another factor, however, in the operation of a rotary kiln is its tendency, toward "ovality." That is to say, under the influence of heat, the load and the weight of the kiln shell and its refractory lining, the shell tends to flatten at its uppermost and lowermost portions and becomes slightly more oval than truly round. This in turn places various stresses on the refractory lining, particularly where the central portion is divided by partition walls as in a trefoil kiln. Still other important factors are the tendency of the shell to deflect or deform vertically, and other distortions under load and driven rotation. As noted, another means attempting to improve the operation of the kiln has been the incorporation of lifters which are projections in the refractory lining of the kiln, extending radially of the kiln in any given cross section but for only a short distance as compared with the diameter of the kiln, whereby such lifters as they pass beneath a bed of charge will carry a portion of it along and upwardly along the side wall dropping it off again as it approaches the uppermost part of its travel in the rotation of the kiln, the particles dropping down again into the lower segment of the kiln and passing through the hot furnace gases as they fall. In the past, these lifters have been made of brick, usually of a number of brick mortared together, although in one instance, a single brick to project above the general or normal surface of the kiln lining has been proposed. In this single brick, a plurality of metal rods extend from the top or hot face of the brick through the brick and the kiln shell, each being bolted at the exterior of the shell to retain the brick in place. A substantial amount of heat is lost through such metal rods which enable a free flow of heat to the exterior. Other disadvantages of the lifters built up of individual bricks have been that spalling and breakdown have rapidly occurred so that the life of such lifters has been short and they have proved uneconomical to install.

Brief statement of the invention

According to the present invention, there is now provided an improved rotary kiln lining having at least one lifter element which comprises a monolithic refractory mass of substantial size but of diminutive length compared with the total length of the kiln, such element being disposed generally longitudinally in the kiln or generally parallel to the longitudinal axis of the kiln. The leading and trailing faces of such lifter element taper toward each other and in one embodiment the trailing face is elongated or exhibits a smaller angle to the base line of the element as compared with the leading face. The trailing face provides a buttress-like cross-section to strengthen the element. The lifters are provided with an anchor means or a retaining means which comprises a rod-like element having means for keying or tying to the monolithic refractory mass and is embedded therein to reduce heat loss, the anchor or tie means being floatably or flexibly connected to the shell whereby it is adapted to adjust to relative motion between the shell and the refractory lining, all as described in more detail below. Such projecting elements as are described herein are also suitable for installation in a nose ring and properly disposed will alter the rate of discharge of a calcined or fired charge, speeding or slowing it depending upon whether the slope of the carrying face is toward or away from the discharge opening. The invention will be particularly described with respect to lifter elements as disposed in a heating zone.

Brief description of the drawings

In the annexed drawings there are shown some embodiments of the present invention wherein:

FIG. 3A is like FIG. 3 but showin a combustible insert;

FIG. 3B is a sectional view of the anchor device of FIG. 2 and taken on line 3B—3B' of FIG. 2;

FIG. 4 is a schematic drawing of the arrangement and forms for emplacement of the lifter element in the kiln lining;

FIG. 5 is a view, on line 5—5 of FIG. 1, schematically showing the location of anchors in a lifter element;

FIG. 6 is a side elevational view of a lifter in place in a kiln lining, taken on line 6—6 of FIG. 1;

FIG. 7 is a side view of another embodiment of a lifter element in place in the kiln lining;

FIG. 8 is an end view of the arrangement for installing a cast lining in a rotary kiln, extending between cast lifter elements;

FIGS. 10a, 10b, 10c, and 10d show some variant embodiments of the floatable anchor of the present invention.

Description of the invention

Figure 1:
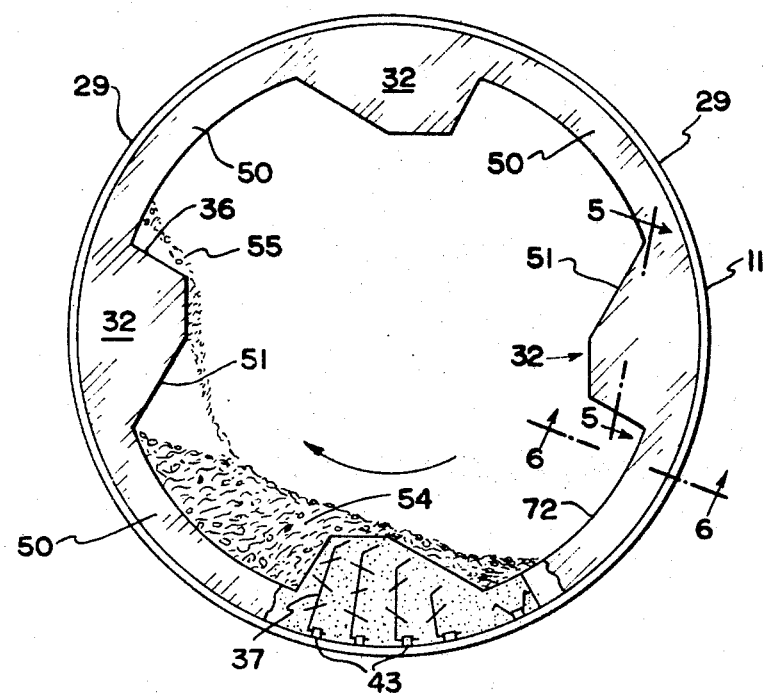
FIG. 1 represents a cross section of a rotary kiln having a cast lining and lifter elements cast therein, one of the latter being cut away to show disposition of the tie elements therein.

In the installation of an improved lining, according to the present invention, it is sometimes advantageous to cast an entire ring and to include the desired number of lifter elements in such ring as it is being cast. If desired, the lifter elements can be installed and then the remaining portions of the ring completed. End form boards are provided, for the lifter element, which usually extend upwardly starting at the surface of the adjacent lining or, where desired, can extend from the interior surface of the kiln shell; but adjacent rings of brick or of previously cast material can form the ends of the casting mold for the lining and partially for a lifter element. In casting a ring of lining, form boards are laid entirely or as needed around the entire ring, by means of snap ties of known construction; and a pair of such a ring is shown in FIG. 8. A starting form board 10 is placed longitudinally of the kiln shell 11, its width extending radially of the shell, board 10 being suitably braced by angle irons 12 tackwelded to the shell for easy removal after hardening of the refractory material to be cast as described below. Snap ties 14 and metal anchors 15, as many as desired of each, are welded to the shell at suitable intervals, snap ties 14 serving to space form boards 23 from shell 11 to the desired lining depth and anchors 15 serving to reinforce the cast refractory and hold it in place. Snap ties 14 are of well-known construction, suitably of high carbon steel whereby they rapidly oxidize during operations of the kiln, the residual metal oxides so formed combining with adjacent refractory material and volatilizable oxides going off with the furnace gases. Each such tie comprises a foot portion 17 welded to shell 11, a central rod 18 extending generally radially into the kiln, a washer 20 affixed to rod 18 at a desired distance from shell 11 and maintaining board 23, which rests thereon, at the desired depth of casting, and an enlarged head 21 which passes through an aperture or hole 19 in board 23. Board 23 and snap tie 14 are then locked together by the action of slotted wedge 24 in the known manner. Snap tie 14 is also provided with a weakened zone or area 25 spaced inwardly of washer 20, to enable eventual snapping off of the upper portion of snap tie 14 and removal of board 23. Boards 23 are of suitable length to extend over the longitudinal dimension of the ring to be cast, and all boards 23 except the second board from bracing iron 12, i.e. board 23', are tongue-and-groove construction to form an interfitted ring, which is laid around the shell as far as desired prior to the casting step. Suitably, each end of a board 23 overlies the surfaces of adjacent refractory rings which also aids in casting the new ring to the same depth and thickness as adjacent material, especially where the latter is not worn or eroded.

When the placing of boards 23, 23' is completed, board 23' is removed by dislodging wedge 24 and twisting the top of snap tie 14 to cause it to break at 25 to partially release board 23'. Board 23' does not interfit by tongue-and-groove with adjacent boards but is nailed in place as at 27 and upon removal of the nails can then be pulled off to expose a cavity 26 into which refractory castable is poured to fill up the space between shell 11, starting board 10, first form board 23 and at least a portion of the opening or mold space left by removal of board 23'. A vibrating device as commercially available and of known type is inserted into the cast refractory to densify the same.

A refractory batch suitable for casting in such a ring disposed in the intermediate zone of a cement kiln, i.e. just prior to the hot zone, is a composition comprising coarse, fired clay braules and a minor amount of an air setting refractory bonding component such as calcium aluminate. The dry batch, containing for instance from 10% to 40% calcium aluminate cementitous agent, 0% to 20% of a plasticizer such as pulverized clay or grog, the remainder calcined fire clay in sizes of from substantially entirely passing through a one-inch mesh by down to be retained on 65 mesh (Tyler screens), is mixed with a minimum amount of water to give a casting consistency, e.g. with from about 8% to 15% thereof, just prior to use, and is cast into the form or mold cavity provided as described hereinabove, vibrated at high frequency of 10,000 vibrations/min. or higher and stiffened, the latter occurring quite rapidly. After introduction of as much castable mix as possible in this first casting pass or zone, the next succeeding form board 23 is removed and another amount of the castable mix is poured into the cavity so formed before the first-poured amount of castable has stiffened and is vibrated to densify and to join to the previous cast refractory. It has been noted that internal vibration of the castable in this operation concentrates some of the finer particles at the upper surface of the mass, forming a smooth, abrasion-resistant wear face thereon. In addition, internal vibration increases density and strength of the refractory mass, improves its uniformity and results in reduced drying shrinkage.

The aforementioned procedure is repeated until it is desired to insert in the lining a cast lifter element. Such an element is diminutive in length compared to the length of the kiln, e.g. often being of about 15 foot length as installed in a 450 to 500 foot kiln, and the lifters are spaced as desired along the internal circumference of the shell. For best balance of the kiln, especially upon operational rotation, a plurality of lifters are symmetrically placed about the periphery of the lining. It has been found convenient and effective to install four such elements at about quadrants of the shell, e.g. as shown in FIG. 1.

To install a lifter, a form 30 is placed longitudinally of the kiln and comprises front end boards 31, shown in FIG. 4, and like rear end boards (not shown), in generally buttress form at one end in side elevation and extending upwardly from the surface of adjacent refractory section, and angle irons 33 conforming to the buttress elevation section and confining boards 35, 35' which form respectively the top or inner face and front side or leading face of the lifter element when completed. In one suitable embodiment, the lifter element extends about ½ to 1¼ inch above the normal lining surface per foot of inside diameter of the refractory lining. For instance, excellent results have been obtained when the lifter element extends 12 inches above a 6 inch lining in a 12-ft. inside diameter lining whether it be a brick lining or a cast monolithic structure. In one instance or embodiment, in a 490 ft., 15' by 13' ft. diameter kiln, each such element placed in the 13' section is 18 inches in total height from the shell, 15 ft. in length and 3 ft. wide, containing approximately 8,000 lbs. of cast, monolithic refractory as described above. Anchors are installed which reinforce and retain each lifter in place as the kiln rotates under operational conditions, and the refractory is cast around such anchors. Anchors are not shown in FIG. 4 for clarity but are suitably disposed in forms 30 as indicated in FIGS. 1 and 5.

Each of forms 30 includes angle irons 33 of the desired shape, form boards 35, 35' and 35" and end boards 31 to close off each end of form 30 to the surface of the adjacent refractory ring. Each angle iron 33 terminates in a foot 47 at each end, and this foot is affixed to the kiln shell 11 and to a form board 35" by a bolt 51 and a suitable spacing washer, or by any other desired means. Form boards 35, which can be tongue-and-groove boards or can be plywood of desired size and shape, are placed within the affixed to angle irons 33, e.g. by bolting, to provide a major portion of mold form 30 into which is later cast refractory material to form lifter 32. One or more form boards 35' are removably attached to adjacent form boards at the upper portion of the form, e.g. by nails, and in the embodiment shown two such boards are provided. Forms 30 are placed, in this embodiment, at quadrants of the circumference of the shell after installation of floatable anchor elements at such sites, and castable refractory as described above is cast in turn into each mold so formed and then vibrated and stiffened, completely surrounding such anchor elements.

Floatable anchor elements comprise an elongated tie element, e.g. a rod or rod-like element, extending generally radially from the interior face of the metal shell 11 of the kiln and having interlocking means to tie the same to the cast monolithic refractory mass to be installed. The tie element is floatably connected to the shell whereby there is enabled limited movement thereof relative to the shell under operational rotation. Suitably, such motion is enabled in substantially any direction, and is restricted in amount to maintain the integrity of the monolithic refractory mass.

Figure 2:
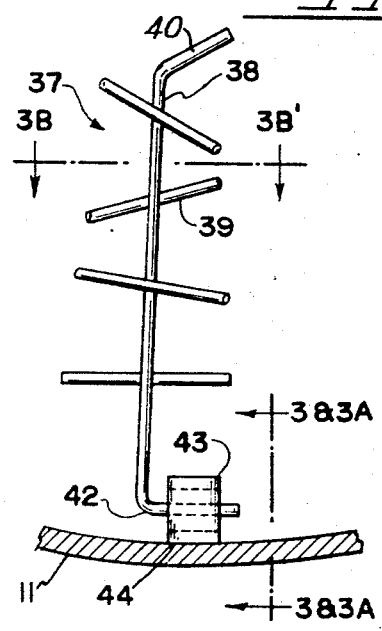
FIG. 2 shows an elevational view of one embodiment of an anchor according to the present invention in place in the kiln shell.
Figure 3:
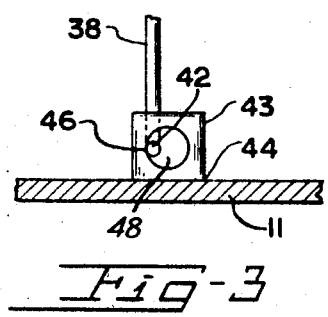
FIG. 3 is a front elevational view of a portion of an anchor such as shown in FIG. 2 floatably attached to the kiln shell, taken on line 3—3 of FIG. 2.

In the embodiment shown in FIGS. 1, 2 and 3, the floatable anchor element 37 comprises an elongated rod 38 to which are welded or otherwise affixed at least one, and in the zones of greater depth of refractory material suitably a plurality of, cross-bars 39 at random angles to the longitudinal axis of rod 38 to tie to or interlock with later-cast refractory. Suitably, for further interlocking, the upper end 40 of rod 38 is bent at an angle to the general longitudinal axis thereof. At the opposite or lower end of rod 38 is disposed foot portion or element 42 extending generally perpendicularly to, or normal to, rod 38. A retaining element, in this embodiment a square nut 43, is firmly affixed to kiln shell 11, suitably by welding as at 44. Foot 42 extends through the central opening in nut 43 and is tackwelded thereto at 46. This tack weld is shown in FIG. 3 to be at the 9 o'clock position with respect to the kiln shell position, but it can be at any other desired position within the aperture. Thus, after completion of the lifter element and placement of the kiln in operational rotation, when the kiln shell 11 deflects or distorts during rotation, or a segment of the shell moves upwardly or downwardly during passage through the ovality cycle, tackweld 46 is broken and foot 42 is free to move upwardly or downwardly within aperture 48, or to the side or in or out to a limited degree as restrained by surrounding refractory mass. This break in metal-to-metal connection also breaks and reduces the heat transfer path through the metal. It has been found advantageous to insert in aperture 48 an evanescent material such as bituminous mass 49 or other combustible substance after tackwelding foot 42 therein to assist in enabling such limited motion as discussed above. Such a material prevents ingress and setting of refractory around foot 42 in aperture 48, and burns out upon heating up of the kiln with evolution of innocuous gases such as $CO_2$ and water vapor which go off with the furnace gases, thereby providing space for movement of foot 42. The detachment of the tie means from direct connection to the shell tends to reduce heat loss through the shell because of the break in metal-to-metal contact.

The placement of anchor elements in plan view in a lifter is shown in FIG. 5 as one example. However, in many instances a more random dispersion to avoid having several anchors in a straight line is helpful in preventing earlier cracking or spalling in use. It is also advantageous that anchor tops adjacent each other terminate at different heights, i.e. varying from each other, to avoid setting up substantial cleavage planes in the refractory mass upon heating. The anchor top in any event is entirely embedded within the cast refractory and suitably terminates at least about two inches below the surface of the refractory mass.

Figure 9:
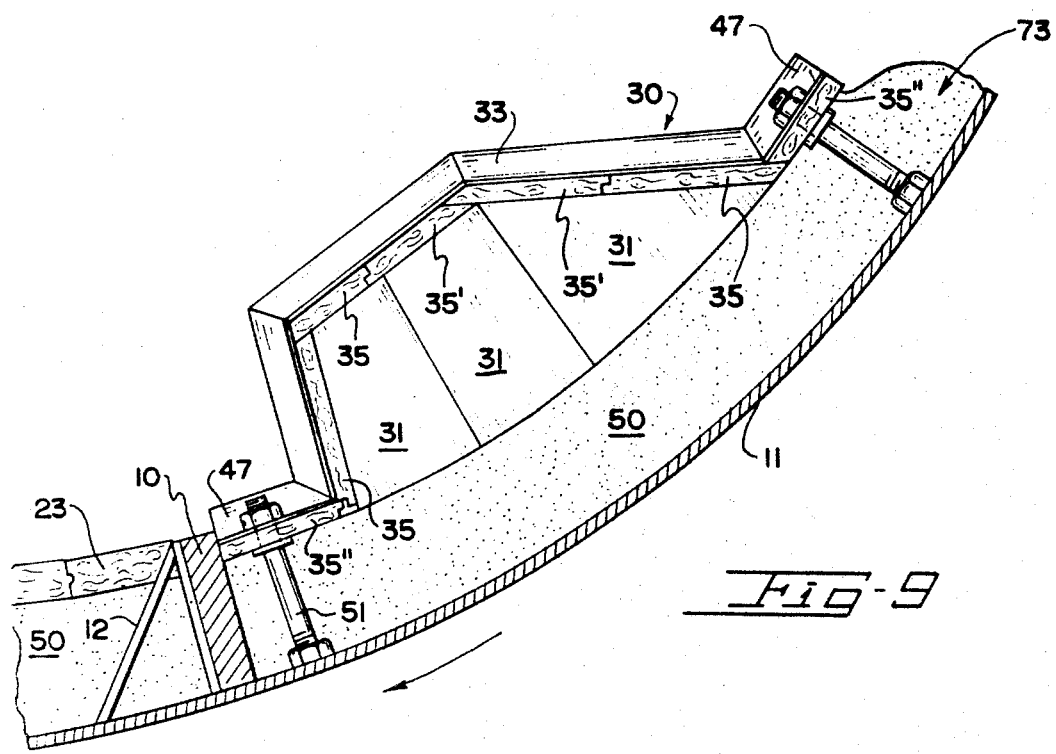
FIG. 9 is an end view of a form for installing a lifter element according to this invention.

As an example of casting a lifter element, the desired number and type of anchors are installed as described elsewhere herein, but not shown here, for clarity and a form or mold 30 is placed thereover in a slightly tilted position, suitably at about the 5 o'clock position of the kiln cross-section as shown in FIG. 9. One or more of form boards 35' are removed and refractory batch material is poured in, vibrated and densified to surround the emplaced anchors and to fill as much as possible of form 30 in this casting pass. Board or boards 35' are then replaced and the remainder of the refractory is poured in at opening 73 to completely surround the anchors and fill mold 30, and is likewise vibrated and densified. Casting of lining 50 can then proceed as described above. After casting of the lifter element has been completed, the form boards are preferably left in place for 24 hours to thereby cure the refractory and the cast section is suitably allowed to stand for a further 24 hours to form a strong hydraulic bond or cold bond prior to heating.

After mold 30 has been filled and vibrated to densify, the mass will have set to sufficient hardness to permit rotation of the kiln to the next position, where casting, e.g. of lining 50, is continued. In one mode of procedure, a lifter element is cast, then the lining portion to the next lifter position, the kiln being rotated as necessary to each casting position, the second lifter is cast and the operation repeated until the ring is complete. Casting is so rapid that all portions bond to each other until the last casting pass, where a tight joint or seam appears between the last pass and the starting pass, i.e. between the latest cast and the first cast portions of the refractory mass. Such a seam is effected in the embodiment of FIGS. 8 and 9, for instance, where end board 10 is removed after hardening of the cast refractory originally contained thereby and successive casting passes bring the cast mass to this point to close the ring. In another embodiment, all of the lifter elements of a given ring, e.g. four such elements spaced 90° from each other on the center lines, are formed in position and thereafter the lining portion 50 is cast as described above to coat the portions 29 of the shell 11 between lifters 32.

Figure 10A:
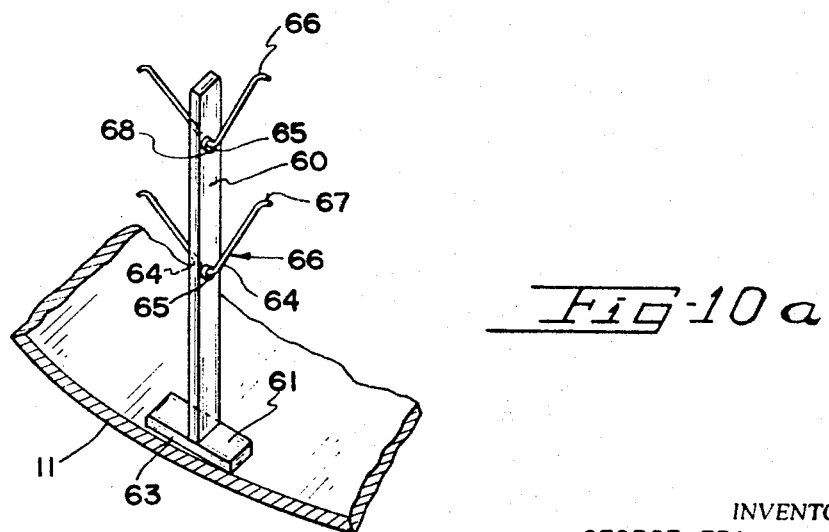

Various additional embodiments of an anchor which is floatably or flexibly connected to the shell are shown in FIGS. 10a, 10b and 10c. In FIG. 10a, a strap element 60, having a base 61 substantially normal to element 60 and firmly welded to shell 11 at 63, also is provided with one or more apertures 65 through which are disposed tie means 66 tackwelded at 68 to strap 60 within aperture 65 suitably at the 3 o'clock or 9 o'clock position with reference to the long axis of 60. Tie means 66 are suitably contoured, e.g. as at end portions 67 bent at an angle to the arm 64 of each tie element 66, to tie or key into a refractory mass to be later cast around the anchor element to embed the same. When stresses are later set up under operational rotation of the kiln and shell 11 tends to move locally with respect to the later-installed lining and lifter, tackweld 68 is broken permitting limited and restricted movement of an element 66. Still other embodiments are those of FIG. 10b, showing a serpentine form of tie element 69 where the corrugations or curved portions key into cast refractory; and FIG. 10c, wherein a spiral or coil tie element 70 provides a good tie or key to the cast refractory and in both of the latter embodiments the floatable or flexible connection can suitably be effected by passing a foot portion 71 of either embodiment through a nut 43 welded to shell 11, foot 71 being tackwelded to nut 43, all as described above in relation to the device of FIGS. 2, 3 and 3A.

Instead of tackwelding to form the breakable or floatable connection where desired, the breakable bond can be effected by a suitable cement or adhesive compatible with the metal and the refractory, for instance, an epoxy resin, solder or other. FIG. 6 is a view in side elevation, of a lifter 32 as defined herein, wherein the downkiln face 52 tapers inwardly to the upper face 53. This form is advantageous in the economy of installation because in service when early spalling or erosion occurs it has been found to result in such a configuration of the end face, after which the lifter stabilizes and retains this shape for long periods. FIG. 7 is a side elevation view of another embodiment of a lifter according to the present invention.

As set forth above, the leading and trailing faces of the lifter element taper toward each other. Such an arrangement is shown as an example in FIG. 1 where leading face 36 is at a slight taper inwardly of about 15° to 20° from a radial line through the juncture of face 36 with the inner or exposed surface 72 of lining 50; and trailing face 51 lies at an angle of about 45° with the base of lifter 32, or with a radial line through the juncture of face 51 with the inner or exposed surface 72 of lining 50. In cross-section, lifter 32 is buttressed by the trailing edge enclosed within face 51, and strengthened thereby. It will be understood that the angles of taper of both such above faces can be changed while retaining a surface at the leading face from which the raised feed can slide and cascade back to the main bed; and the trailing edge will buttress and assist in supporting the mass of lifter and raised feed.

As an example of the operation of a rotary kiln including the lining arrangement of the present invention, a charge of cement slurry is fed into the kiln in the usual way and passes through the preliminary heating and drying zones, the dried bed 54 of granular feed then passing to the lifter section. Referring to FIG. 1, as the kiln rotates in the direction of the arrow, the lifter element 32 carries a portion 55 of bed 54 upwardly on its leading face 36 which is tapered toward the center line of the lifter whereby the portion 55 slides and cascades off face 36 downwardly through the hot kiln gases onto the hot upper face of bed 54.

It will be understood that the floatable anchor elements vary in height according to the thickness of the refractory mass in which they are embedded and suitably terminate about two inches below the upper surface thereof, i.e. the surface exposed to the heated interior of the kiln, or the so-called hot face, of the refractory mass. The anchors can be made of any suitable material and one excellent material of construction is a heat-resistant steel.

It will also be understood that successive longitudinal sections of the kiln lining can be cast, or installed with bricks, with inclusion of the desired number of cast lifter elements in each section as described herein. In such instance, it is often desirable to stagger the arrangement of the lifters in adjacent sections in order to obtain optimum exposure of the feed charge to heat. The bituminous material plugging aperture 48 of nut 43 is plastic when applied to fill the space around foot 42 and hardens thereafter to resist penetration by the later-cast refractory. Alternatively, a wooden plug or other combustible, gasifiable or evanescent material can be used. Also, with respect to the finished lifter, after drying and hardening, it is sometimes advantageous to apply a coating of abrasion resistant material, such as a phosphate-bonded tabular alumina refractory, over the wear face of the lifter, to resist wear by especially abrasive feed charges.

It is found that many advantages flow from the operation of a rotary kiln of such lining structure. The efficiency of heating in such kiln is so improved that less volume of gas passes therethrough at a lower temperature and thus at a lower velocity; and as a further consequence the dust load of the gases issuing from the kiln is greatly reduced, although by reason of greater exposure of the feed bed a larger dust component of the exiting gases might be expected. In one instance, in a commercial scale test in a large-diameter cement kiln the dust load has been reduced by about one-third which represents a great saving in both capital and operating dust collection costs and is a boon to the nearby countryside as well. It has also been found as an unexpected advantage that the grinding of cement clinker issuing from such kiln where successive rings of lifters are installed is less costly and is simplified. The clinker also contains less overburn and underburn than clinker from the usual kiln or from the same kiln prior to installation of the lifter elements in even one ring. As a result of the lowered volume of hot gases through such kiln it has also been noted that the temperature of chains on the hot side of the chain section has been found to run about 100° F. less than in comparable kilns without the lifters and this in turn results in longer chain life. These factors indicate a lower velocity of kiln gases; and it has been found that, in one wet-process cement kiln according to this invention, the amount of gas necessary to produce clinker has been reduced by about 8%. Conversely, however, increased production is obtainable in a given kiln with the same B.t.u. or fuel input as in the same kiln not fitted with the lifters, with no increase in dust loss, substantially the same chain temperature and substantially all other conditions remaining the same as without lifters. It is still a further advantage over prior lifter elements formed of a plurality of bricks, that installation of the cast lifters is very rapid, resulting in less labor costs and in less down-time of the kiln. Further advantages are that the cast lifters have much longer useful life than such brick lifters, do not conduct substantial amounts of heat to or outside of the shell; and that inspection of the articles after about 90 days of service reveal so little surface wear that the form-marks are still visible. Also, the cast lifters are not subject to the pinch-spalling so frequently found in multiple-brick structures. It has been found that the operation of the kiln fitted with the lifters of this invention has become smoother, easier to control, more economical and much more free of the dust problem; and the kiln has been brought on-line much more quickly than without the lifters and no waste clinker was produced, the first run giving a satisfactory product.

It has been observed that in a kiln having a set of lifters according to this invention, the main feed bed is of more uniform temperature; and, additionally, the alkali content of the clinker product is reduced so that less expensive or so-called "dirtier" starting rock can be fed to the kiln. Speed of kiln rotation can also be increased, if desired.

In the above description the screen sizes which are shown are Tyler screens; and all percentages are by weight unless otherwise indicated. The lifters have been described as generally parallel to the axis but it will be understood that they can be disposed at an angle to the axis, suitably up to about a 45° angle, and at an angle will function either to accelerate or to retard the flow of feed through the kiln, depending upon the direction of the slant. In casting to form a monolithic refractory ring with included lifter elements according to the present invention, it is advantageous to ram in the last section of the ring rather than vibrate the mass in order to obtain the best packing and closure of the ring. The lifted portion of feed slides off the leading face of the lifters and cascades downwardly back to the main bed of feed, and suitably this cascade is to the side of the cross section of the kiln and out of the swiftest stream of gas. Although the surfaces of the various faces of the lifter element, e.g. the leading face, the trailing face, and end and top faces, have been shown as plane surfaces, it will be understood that these can be corrugated in any desired direction or otherwise interrupted.

In ordinary commercial kiln installation, the longitudinal section of the cast lining including the lifters will correspond to several of the usual "rings" of brick. The term "evanescent" as used herein with respect to protecting the connector closure against ingress of later-cast refractory material, is intended to mean any solid material which will disappear or go off upon firing of the kiln to leave an opening wherein the foot portion can move about to a limited extent. A suitable material for such evanescent composition is a combustible organic material such as pitch or tar or bituminous material which burns off upon heating of the refractory lining giving essentially gaseous products of combustion such as water and carbon oxides which go off with the furnace gases. In the description above, the refractory batch used for casting the lining is suitably of the same composition as that employed in casting the lifters; and in any event is a compatible refractory material. Where multiple sets of lifters are installed, it has been found in some instances that all of the cement clinker issuing from such kiln is minus one inch in diameter and over 75% thereof has been less than one-half inch in diameter, which facilitates grinding of the final product.

It will be understood that the above specific description and drawings have been given for purposes of illustration of the invention and that variations and modifications can be made therein.

Having now described the invention, what is claimed is:

1. In a rotary kiln a metal shell and a refractory lining coating the interior of said shell and having an exposed interior surface over which a load travels during operation of the kiln, the improvement wherein said lining is provided with a lifter element
   (a) extending generally longitudinally of said lining,
   (b) said element being of large volume but of diminutive length with respect to the total length of said lining and
   (c) extending above the general exposed surface of said lining whereby said lifter interrupts the flow of a load travelling through said kiln when in operational rotation to lift a portion of said load upwardly along the periphery of said exposed surface,
   (d) said lifter being comprised of monolithic refractory material and
   (e) having embedded and enclosed therein at least one anchor,
   (f) said anchor comprising an elongated tie element extending generally radially from the metal shell of said kiln and having interlocking means to tie the same to said monolithic refractory, said tie element being floatably connected to said shell whereby each said anchor is adapted to adjust to relative motion of said shell with respect to said lining under stress of operational rotation of said shell.

2. An improved lining as in claim 1 wherein said lining is provided with a plurality of such lifter elements symmetrically disposed about the periphery of said lining.

3. An improved lining as in claim 1 wherein said lifter element comprises a leading face and a trailing face and said faces converge toward each other upwardly from said lining.

4. An improved lining as in claim 3 wherein said trailing face converges at a greater angle to a radius of said furnace lining then said leading face and provides a buttress for said lifter.

5. An improved lining as in claim 1 wherein said lifter element is provided with a plurality of said anchors and adjacent anchors terminate at different heights within said monolithic refractory.

6. An improved lining as in claim 1 wherein said anchor comprises
   (a) a central rod extending radially from said shell,
   (b) a plurality of arms affixed to said rod and extending outwardly therefrom,
   (c) a foot portion extending generally perpendicularly from said rod, and
   (d) a connector affixed to said shell and having an aperture therethrough,
   (e) said foot portion being disposed within said aperture and releasably affixed to said connector.

7. An improved lining as in claim 6 wherein said foot portion is affixed by said connector by a tack-weld.

8. An improved lining as in claim 6 wherein an evanescent material is disposed within said aperture to prevent ingress of later-applied cast refractory material.

9. An improved lining as in claim 9 wherein said evanescent material is a bituminous composition.

10. An improved lining as in claim 1 wherein there are provided four of said lifters disposed circumferentially in a ring at quadrants of said lining, and said refractory lining between said lifters is of said monolithic refractory material.

11. In a rotary kiln a metal shell, and a refractory lining coating the interior thereof and having an exposed interior surface over which a load travels during operation of the kiln, the improvement wherein said lining is provided with
   (a) a plurality of lifter elements symmetrically disposed circumferentially in a ring in said exposed surface, each of said elements
   (b) being of dimunitive length with respect to the total length of said lining, and
   (c) extending above said exposed surface in a direction generally parallel to the longitudinal axis of said kiln whereby said lifter element is adapted to engage and lift a portion of said load upwardly along an arc of said lining,
   (d) each said element having a leading face and a trailing face, a top face, an upkiln end face and a downkiln end face,
   (e) said downkiln end face converging upwardly toward said upkiln end face,
   (f) said leading face tapering inwardly from said shell charge said portion back to said load after said toward said top face and being adapted to dislifting,
   (g) said element having a buttress cross-section at said trailing face,
   (h) said lifter element being comprised of monolithic refractory material and
   (i) having embedded and enclosed therein a plurality of metal anchors disposed adjacent each other,
   (j) adjacent anchors terminating at different heights to avoid cleavage lines,
   (k) said metal anchors each having a central rod extending generally radially from said shell and a plurality of arms affixed to said rod and extending outwardly therefrom, and a foot extending generally perpendicularly from said rod adjacent said shell,
(l) a connector affixed to said shell and having an aperture therethrough,
(m) said foot of said rod passing throught said aperture and filling a portion of said aperture and being tack-welded to said connector whereby said tack-weld is adapted to rupture under later-applied stresses in operation of said kiln, and
(n) a solid bituminous mass filling the remainder of said aperture.

References Cited

UNITED STATES PATENTS

| | | | |
|---|---|---|---|
| 1,801,662 | 4/1931 | Crutcher et al. | 263—32 |
| 1,977,117 | 10/1934 | Bebuch | 263—32 X |
| 3,036,822 | 5/1962 | Andersen | 263—32 |
| 3,306,237 | 2/1967 | Ransom | 263—32 X |

JOHN J. CAMBY, *Primary Examiner.*

U.S. Cl. X.R.

110—14

UNITED STATES PATENT OFFICE
CERTIFICATE OF CORRECTION

Patent No. 3,445,099                                      May 20, 1969

George Franklin Olsen et al.

It is certified that error appears in the above identified patent and that said Letters Patent are hereby corrected as shown below:

Column 2, line 10, "tendency, toward" should read -- tendency toward --. Column 3, line 23, "showin" should read -- showing --. Column 4, line 37, "braules" should read -- granules --. Column 5, line 36, "the" should read -- and --. Column 10, line 62, beginning with "(f) said" cancel all to and including "lifting" in line 65, same column 10, and insert -- (f) said leading face tapering inwardly from said shell toward said top face and being adapted to discharge said portion back to said load after said lifting --.

Signed and sealed this 17th day of November 1970.

(SEAL)
Attest:

Edward M. Fletcher, Jr.

Attesting Officer

WILLIAM E. SCHUYLER, JR.

Commissioner of Patents

UNITED STATES PATENT OFFICE
CERTIFICATE OF CORRECTION

Patent No. 3,445,099         Dated May 20, 1969

Inventor(s) George Franklin Olsen et al, Assignors to Kaiser Aluminum & Chemical Corporation It is certified that error appears in the above-identified patent and that said Letters Patent are hereby corrected as shown below:

Column 10, line 36, "claim 9" should be -- claim 8 --.

SIGNED AND SEALED
MAR 9 1971

(SEAL)
Attest:

Edward M. Fletcher, Jr.
Attesting Officer

WILLIAM E. SCHUYLER, JR.
Commissioner of Patents